(12) United States Patent
Hosoi

(10) Patent No.: US 8,325,358 B2
(45) Date of Patent: Dec. 4, 2012

(54) IMAGE FORMING APPARATUS

(75) Inventor: Tetsuya Hosoi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 714 days.

(21) Appl. No.: 12/178,063

(22) Filed: Jul. 23, 2008

(65) Prior Publication Data

US 2009/0027720 A1    Jan. 29, 2009

(30) Foreign Application Priority Data

Jul. 25, 2007  (JP) ................................ 2007-193380

(51) Int. Cl.
*G06F 3/12*  (2006.01)

(52) U.S. Cl. ..................... 358/1.15; 358/1.13; 358/1.14; 382/305

(58) Field of Classification Search ........................ None
See application file for complete search history.

(56) References Cited

U.S. PATENT DOCUMENTS

| | | | | |
|---|---|---|---|---|
| 5,818,606 A | * | 10/1998 | Muramatsu et al. | 358/405 |
| 2006/0017970 A1 | * | 1/2006 | Park et al. | 358/1.15 |
| 2007/0070475 A1 | * | 3/2007 | Yamazaki | 358/540 |

FOREIGN PATENT DOCUMENTS

| | | |
|---|---|---|
| JP | 11192760 A | 7/1999 |
| JP | 2005160019 A | 6/2005 |
| JP | 2005-202669 A | 7/2005 |
| JP | 2006140622 A | 6/2006 |
| JP | 2007096914 A | 4/2007 |
| JP | 2007-156786 A | 6/2007 |

* cited by examiner

*Primary Examiner* — Marivelisse Santiago Cordero

*Assistant Examiner* — Aaron R Gerger

(74) *Attorney, Agent, or Firm* — Panitch Schwarze Belisario & Nadel LLP

(57) ABSTRACT

An image forming apparatus is supplied enabling print request user to identify whether the requested print data needs an approval or not so as to judge how to treat the corresponding print matter. In the image forming apparatus, an approval request portion sends an approval request electronic mail for requesting an approval of print allowance about an input image to an approval person terminal; an approval allowance/disallowance judging portion judges whether the print allowance is approved or not on the basis of a reply electronic mail output from the approval person terminal; if the print allowance is approved, an image compounding portion compounds an approval image onto the input image.

8 Claims, 19 Drawing Sheets

500

Subject: APPROVAL REQUEST
From: MFP01@abc.com
To: manager@abc.com
Date: 30 Sep 2006 10:20

Body Text:
PLEASE APPROVE DOCUMENT IN FOLLOWING BOX.
　　　502　　　　　　　　　　　501
A01 : APPLICATION FORM / MANAGING PART / A APPLICATION FORM

A02 : APPLICATION FORM / MANAGING PART / B APPLICATION FORM
　　　502　　　　　　　　　　　501

Subject: APPROVAL RESULT
From: manager@abc.com
To: MFP01@abc.com
Date: 30 Sep 2006 11:33

Body Text:
APPROVAL RESULT.
　　514　　　　　　　　511　　　　　　　　　　513　　512
A01 : APPLICATION FORM / MANAGING PART / A APPLICATION FORM > ALLOWANCE A02 : APPLICATION FORM / MANAGING PART / B APPLICATION FORM > DISALLOWANCE
　　514　　　　　　　　511　　　　　　　　　　513　　512

| APPROVAL IMAGE DESIGNATION INFORMATION | APPROVAL IMAGE ID |
|---|---|
| INEXISTENCE | D 0 0 1 (TANAKA) |
| A | D 0 0 2 (SHIMIZU) |
| B | D 0 0 3 (SUZUKI) |
| C | D 0 0 4 (KOBAYAKAWA) |
| ⋮ | ⋮ |

*FIG. 7*

IMAGE FORMING APPARATUS

BACKGROUND OF THE INVENTION

1. Field of the Invention

The invention relates to an image forming apparatus which is connected with network and is used to form an input image inputted via the network.

2. Related Background Art

As a kind of image forming apparatus to restrict print, conventionally, for example, there is an image forming apparatus which, after received print data from an upper apparatus or read print data by a reading section, makes an electronic mail for obtaining an approval of print allowance of the print data; and sends the electronic mail to approval person terminal (i.e. terminal used by approval person who has a right to perform the approval of print allowance); then prints the print data after received a reply mail representing to approve print from the approval person terminal (for example, refer to patent document 1)

Patent document 1: Japan patent publication 2005-202669.

However, in the image forming apparatus, there is such problem, that is, the reply mail representing to approve print from the approval person terminal only indicates whether to print the print data or not, but does not indicate to identify whether the print data to be printed is or not that needing an approval for print request user, therefore, with respect to the print request user, he/she will not know how to treat such print matter on which the print data is printed. For example, in general, because important information obtained from the print data needing an approval is stated in the print matter, so the print matter should not be shown to other person, thereby, the print request user must pay attention to the print matter so as to make other person see it.

SUMMARY OF THE INVENTION

It is, therefore, an object of the invention to provide an image forming apparatus capable of solving the above problem. That is, the image forming apparatus enable the print request user to identify whether the requested print data is or not that needing an approval so as to enable the print request user to judge how to treat the print matter.

An aspect of the invention provides an image forming apparatus which is connected with a network and performs an image formation on the basis of an input image. The image forming apparatus comprises a first storing portion that stores the input image; a second storing portion that stores an approval image indicating an approval of print allowance; an approval request portion that requests an approval with respect to the input image stored in the first storing portion via the network; a judging portion that judges whether the input image is approved to print on the basis of a reply with respect the request of the approval request portion; and an image compounding portion that forms an image obtained by compounding the approval image stored in the second storing portion with the input image stored in the first storing portion when the judging portion judged that the input image is approved.

EFFECT OF THE PRESENT INVENTION

According to the present invention, when the judging section judged that the input image is approved, the image forming section generates an image through compounding the input image stored in the first storing portion with the approval image stored in the second storing portion, so it is possible to enable the print request user to identify whether the requested print data is or not that needing an approval The above and other objects and features of the present invention will become apparent from the following detailed description and the appended claims with reference to the accompanying drawings.

BRIEF DESCRIPTION OF THE DRAWINGS

FIG. 3A is a diagram showing an example of approval request electronic mail;

FIG. 3B is a diagram showing an example of reply electronic mail;

FIG. 7 is a diagram showing an example of approval image selection list in FIG. 6;

DETAILED DESCRIPTION OF THE PREFERRED EMBODIMENTS

Embodiments of the invention will be described in detail hereinbelow with reference to the drawings.

Embodiment 1

Figure 1:
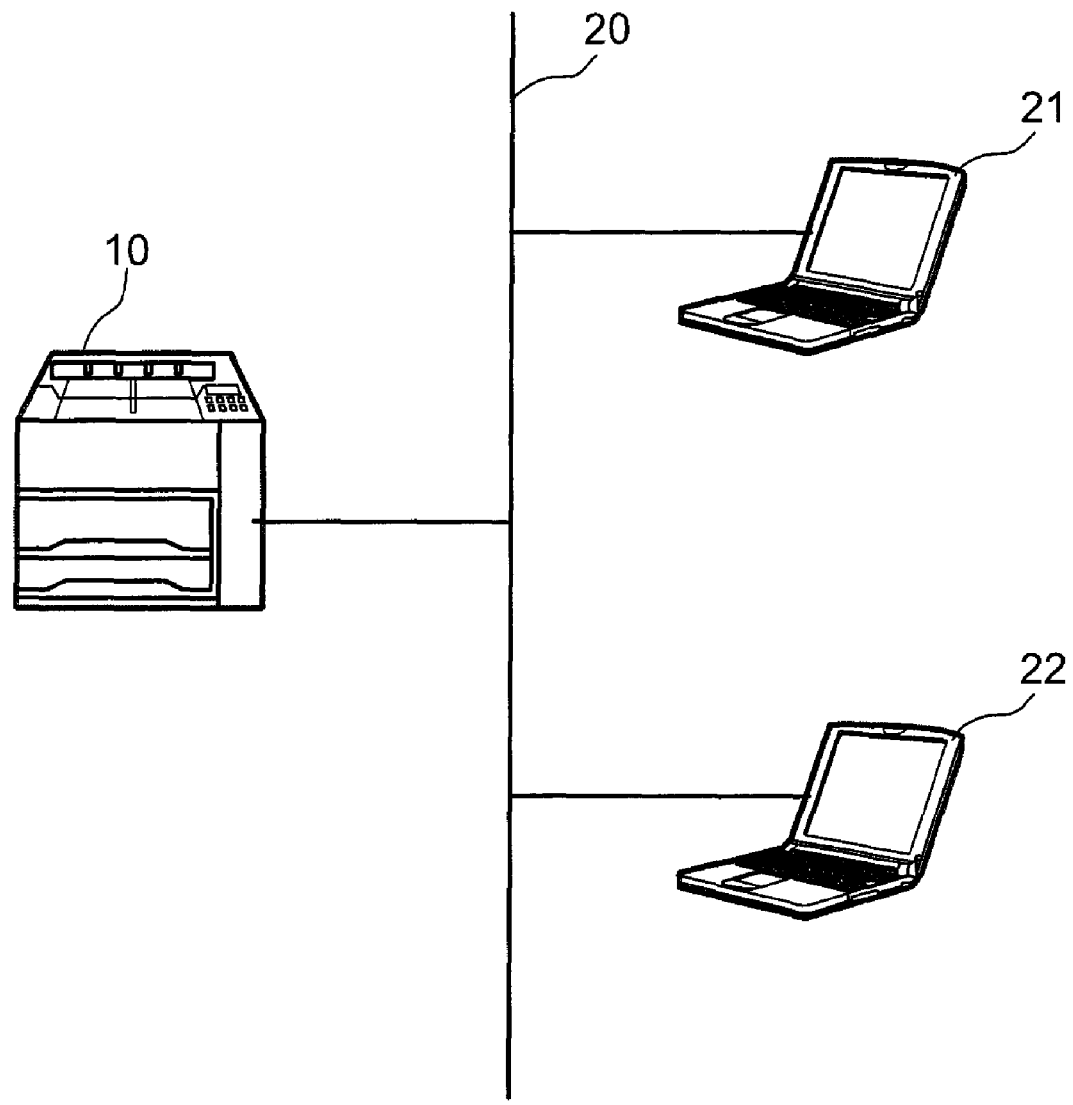
FIG. 1 is a block diagram showing a structure of an image forming system in which an image forming apparatus of the present invention is used.

FIG. 1 is a block diagram showing a structure of an image forming system in which an image forming apparatus of the present invention is used.

The image forming system comprises a MFP (Multi Function Peripheral) apparatus 10 functioning as an image forming apparatus; a PC (Personal Computer) 21 which, as an upper apparatus, is used by a document making person; and a PC 22 which, as an approval person terminal, is used for approving a print allowance, by an approval person who has a right to approve a print allowance of image data requested to print. The MFP apparatus 10, the PC 21 and the PC 22 are communicatively connected each other via a network 20.

Figure 2:
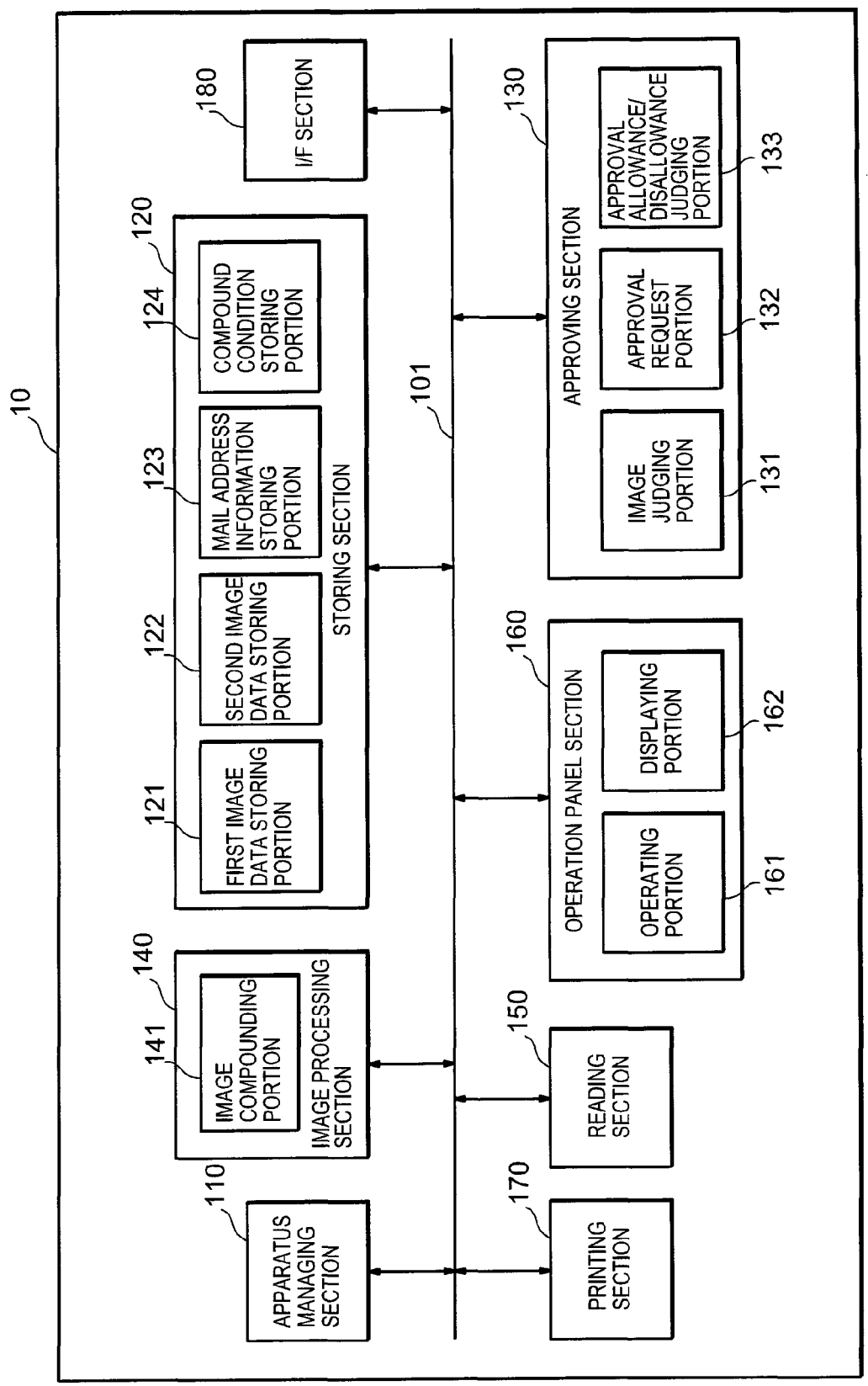
FIG. 2 is a block diagram showing a structure of an image forming apparatus in embodiment 1 of the present invention.

FIG. 2 is a block diagram showing a structure of the MFP apparatus (an image forming apparatus) in embodiment 1 of the present invention.

The MFP apparatus 10 comprises an apparatus managing section 110; a storing section 120; an approving section 130; an image processing section 140; a reading section 150; an operation panel section 160; a printing section 170; and an I/F section 180. These sections are connected each other via a bus 101.

The apparatus managing section 110 manages operation or status of other sections. For example, the apparatus managing section 110 outputs a judgment request to the approving section 130 to judge whether first image data (mentioned below) needing to be approved exists or not. Further, the apparatus managing section 110 outputs a print request of compound image (mentioned below) stored in a work area of the storing section 120 to the printing section 170 after a notification representing that compound image data (mentioned below) has been generated is inputted from an image compounding portion 141. Furthermore, the apparatus managing section 110 not only deletes first image data of the input image read out from a specific area (mentioned below) of a first image data storing portion 121 of the storing section 120 when generating compound image; but also deletes the compound image data of the compound image stored in the work area.

The storing section 120, as a memory block to store various information in the apparatus, includes a first image data storing portion 121; a second image data storing portion 122; a mail address information storing portion 123; and a compound condition storing portion 124.

The first image data storing portion 121 has a specific area composed of a folder having multi-layer structure and of a file name in which a document name is stated, to store image data (hereinafter: first image data) serving as original document of approval object formed from image data of input image which is read out by the reading section 150 or is received from the PC 21 serving as an upper apparatus. Moreover, the specific area is specified by a managing portion of document having character such as document name of image data.

In the case that the print allowance is given regarding the first image data of input image stored in the first image data storing portion 121, the second image data storing portion 122 stores image data (hereinafter: second image data) of approval image for enabling print request user to identify that it is possible to obtain the approval of the print allowance when input image is printed. Here, in the approval image, image data formed from a seal image (refer to FIG. 4) of approval person is used. Moreover, it is possible to use other image such as signature image of approval person.

The mail address information storing portion 123 stores mail address assigned to the PC 22 serving as approval person terminal and mail address assigned to self apparatus.

The compound condition storing portion 124 stores a compound condition for compounding the input image formed from the first image data stored in the first image data storing portion 121 with the approval image formed from the second image data stored in the second image data storing portion 122. In the embodiment, the compound condition is to set lower left point of the input image into a (0, 0) coordinate position and set lower left point of the approval image into a (0, 0) coordinate position so as to put the first image data having the (0, 0) coordinate position of lower left point and the second image data having the (0, 0) coordinate position of lower left point together.

The approving section 130 includes an image judging portion 131; an approval request portion 132; and an approval allowance/disallowance judging portion 133. The image judging portion 131 judges whether the first image data waiting for approval exists or not through detecting whether file of input image stored in the specific area of the first image data storing portion 121 exists or not. Then, the image judging portion 131, when detected that file of input image stored in the specific area of the first image data storing portion 121 existed, judges that the first image data waiting for approval exists, and outputs a making request of approval request electronic mail (mentioned below) to the approval request portion 132 to request an approval of print allowance of the input image with respect to the approval person.

The approval request portion 132, when received the making request from the image judging portion 131, makes an approval request electronic mail 500 shown by FIG. 3A; and sends the approval request electronic mail 500 to the PC 22 serving as an approval person terminal via the I/F section 180.

FIG. 3A is a diagram showing an example of approval request electronic mail.

In the approval request electronic mail 500, as shown by FIG. 3A, there is a header of electronic mail. In the header, there are a title (Subject) column to state "Approval Request"; a From column indicating a sending source to state a mail address of "MFP01@abc.com" assigned to the self apparatus; a To column indicating a sending destination to state a mail address of "manager@abc.com" assigned to the PC 22 serving as an approval person terminal; and a Date column indicating a sending date to state a date of "30 Sep. 2006 10:20". Further, in the approval request electronic mail 500, there is a text, in the text, a specific area name 501 called "Application Form/Managing Part/A Application Form" and a distinguishment number 502 for distinguishing the specific area name 501 are stated; further, a specific area name 501 called "Application Form/Managing Part/B Application Form" and a distinguishment number 502 for distinguishing the specific area name 501 also are stated. These specific area names 501 and distinguishment numbers 502 are stated according to an order.

The approval allowance/disallowance judging portion 133, when received a reply electronic mail 510 shown by FIG. 3B for replying to the approval request electronic mail 500 sent to PC 22 serving as an approval person terminal, judges whether a print allowance of file of document stated in the specific area name 501 is approved or not on the basis of information stated in the reply electronic mail 510.

FIG. 3B is a diagram showing an example of reply electronic mail.

In the reply electronic mail 510, as shown by FIG. 3B, there is a header of electronic mail. In the header, there are a title (Subject) column to state "Approval Result"; a From column indicating a sending source to state a mail address of "manager@abc.com" assigned to the PC 22 serving as an approval person terminal; a To column indicating a sending destination to state a mail address of "MFP01@abc.com" assigned to the MFP apparatus 10; and a Date column indicating a sending date to state a date of "30 Sep. 2006 11:33". Further, in the reply electronic mail 510, there is a text. In the text, a specific area name 511 called "Application Form/ Managing Part/A Application Form"; an approval result information 512 that is "Allowance" representing that the approval person allows the print; and a distinguishment character 513 that is ">" for specifying the approval result information 512 are stated according to an order of the specific area name 511, the distinguishment character 513 and the approval result information 512, as approval judgment information. In front of the approval judgment information, a distinguishment number 514 for distinguishing the approval judgment information is stated. Further, a specific area name 511 called "Application Form/Managing Part/B Application Form"; an approval result information 512 that is "Disallowance" representing that the approval person disallows the print; and a distinguishment character 513 that is ">" for specifying the approval result information 512 are stated according to an order of the specific area name 511, the distinguishment character 513 and the approval result information 512, as approval judgment information. In front of the approval judgment information, a distinguishment number 514 for distinguishing the approval judgment information is stated.

The image processing section 140 has an image compounding portion 141. The image compounding portion 141, after read out a compound condition from the compound condition storing portion 124, reads out the first image data of input image stored in the first image data storing portion 121 and the second image data stored in the second image data of approval image storing portion 122; generates compound image data formed from a compound image compounded from the input image and the approval image on the basis of the compound condition; and stores the compound image data into the work area (not shown) of the storing section 120.

Figure 4:
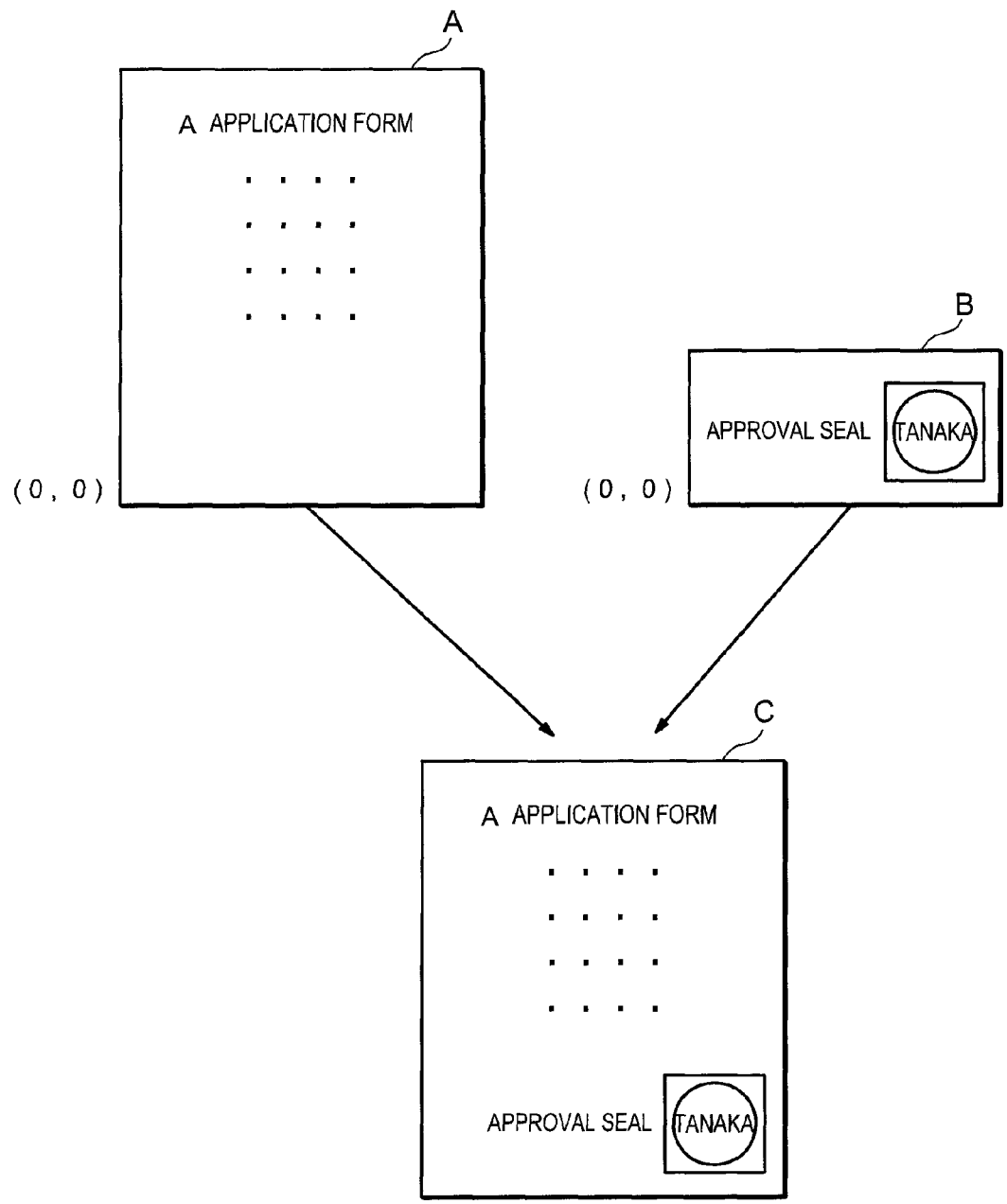
FIG. 4 is a diagram to explain a generation of compound image data after approved.

FIG. 4 is a diagram to explain a generation of compound image data after approved.

For example, as shown by FIG. 4, in the case to regard the first image data read out from the first image data storing portion 121 as first image data of input image of A application form indicated by mark A and regard the second image data read out from the second image data storing portion 122 as second image data indicated by mark B, the image compounding portion 141, as making the (0, 0) coordinate position of lower left point in the input image of A application form finally coincide with the (0, 0) coordinate position of lower left point in the approval image, compounds the approval image into the input image by overwriting the second image data onto the first image data, so that an A application form indicated by mark C is obtained as a compound image, in which a seal of "TANAKA" is stated in the input image of A application form indicated by mark A. Moreover, that overwritten by the second image data is a part of the first image data, in the part, there is no any data.

The reading section 150 is a scanning device using reading sensor such as LED, CCD or the like. The reading section 150 generates the first image data of input image formed from image data obtained after read a manuscript and changed it into electric signal; and writes the first image data into the first image data storing portion 121 of the storing section 120.

The operation panel section 160 has an operating portion 161 formed from an input device such as touch panel or keyboard for inputting command of setting, operation mode or the like to the self apparatus; and a displaying portion 162 for displaying instruction to print request user or displaying status information of the self apparatus.

The printing section 170 reads out compound image data of the compound image stored in the work area of the storing section 120 in order; and prints the compound image onto record paper.

The I/F section 180 is an interface for performing a communication between the PC 21 serving as an upper apparatus and the PC 22 serving as an approval person terminal via the network 20 to send/receive the first image data of input image, electronic mail (e.g. approval request electronic mail, reply electronic mail) and the like.

The following is to explain operation of the image forming apparatus in embodiment 1 of the present invention.

Figure 5:
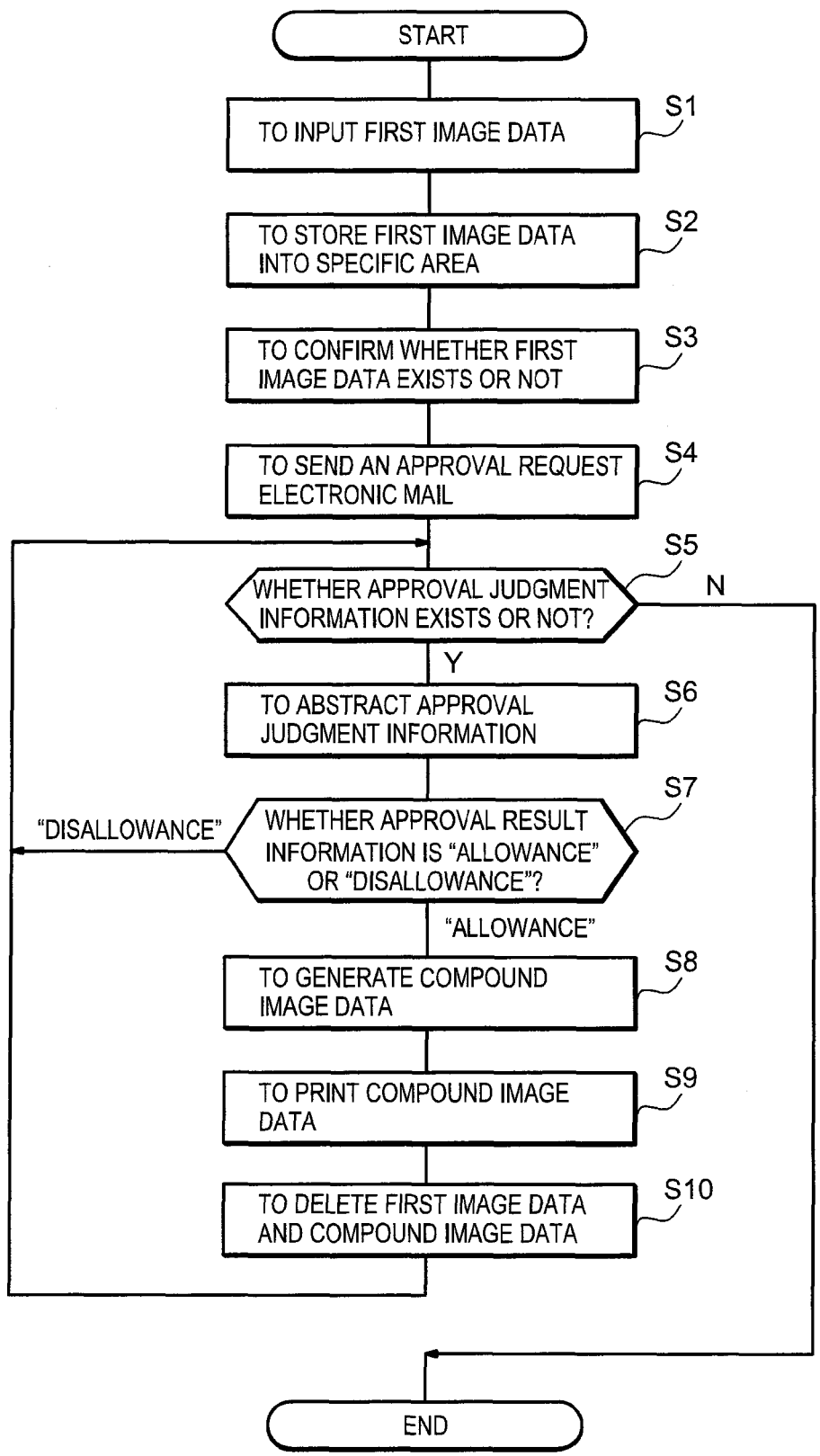
FIG. 5 is a flowchart showing operation of an image forming apparatus in embodiment 1 of the present invention.

FIG. 5 is a flowchart showing operation of an image forming apparatus in embodiment 1 of the present invention.

Initially, in the MFP apparatus 10 functioning as the image forming apparatus of the embodiment 1, the first image data of input image is inputted for printing (Step S1). Here, as a method to input the first image data, it may be an image data receiving method or an image data reading method.

The image data receiving method is that to receive an image file from the PC 21 serving as an upper apparatus via the network 20, in which a command representing a store request to store data into the specific area of the first image data storing portion 121 and the first image data for printing is described.

The image data reading method is that to read out first image data of document by using the reading section 150 after an instruction representing a store request to store first image data into the specific area of the first image data storing portion 121 is inputted from the operating portion 161 of the operation panel section 160.

After the first image data described in the receiving file received from the PC 21 via the I/F section 180 is inputted, or, the first image data of document read out by the reading section 150 is inputted, the first image data is stored into the specific area of the first image data storing portion 121 of the storing section 120 (Step S2).

For example, on the one hand, in the case that the image data receiving method is used and the store place of the first image data of input image of received document is a specific area "Application Form/Managing Part/A Application Form", the apparatus managing section 110 stores the first image data described in the file into the specific area "Application Form/Managing Part/A Application Form". On the other hand, in the case that the image data reading method is used and the specific area inputted from the operating portion 161 of the operation panel section 160 is "Application Form/Managing Part/B Application Form", the apparatus managing section 110 stores the first image data of original document inputted by the reading section 150 into the specific area "Application Form/Managing Part/B Application Form".

After that, the apparatus managing section 110 outputs a confirmation request to confirm whether first image data that should be approved exists or not with respect to the approving section 130.

When the approving section 130 received the confirmation request from the apparatus managing section 110, the image judging portion 131 confirms whether first image data that is waiting for approval exists or not through detecting whether file in which first image data is described exists in the specific area of the first image data storing portion 121 or not (Step S3).

In the embodiment, because a file called "A application form" is stored in the specific area "Application Form/Managing Part/A Application Form" or a file called "B application form" is stored in the specific area "Application Form/Managing Part/B Application Form", the image judging portion 131 confirms that the first image data that is waiting for approval exists.

The image judging portion 131, after confirmed that the first image data that is waiting for approval exists, outputs a specific area name in which the first image data waiting for approval is stored to the approval request portion 132.

In the embodiment, as the specific area name, the specific area "Application Form/Managing Part/A Application Form" or the specific area "Application Form/Managing Part/B Application Form" is outputted to the approval request portion 132.

The approval request portion 132, after received the specific area name from the image judging portion 131, reads out the mail address assigned to the PC 22 serving as an approval person terminal and the mail address assigned to the self apparatus from the mail address information storing portion 123 of the storing section 120; makes the approval request electronic mail 500 shown by the FIG. 3A; and sends the approval request electronic mail 500 to the PC 22 serving as an approval person terminal via the I/F section 180 (Step S4).

Then, the approval allowance/disallowance judging portion 133, when received the reply electronic mail 510 shown by FIG. 3B from the PC 22 via the I/F section 180, which is made in order to reply to the approval request electronic mail 500 sent to the PC 22 serving as an approval person terminal, judges whether approval judgment information that is not abstracted yet from approval judgment information described in the reply electronic mail 510 exists or not (Step S5).

On the one hand, the approval allowance/disallowance judging portion 133, when judged that the un-abstracted approval judgment information does not exist in the reply electronic mail 510 (Step S5, NO), end the process. On the other hand, the approval allowance/disallowance judging portion 133, when judged that the un-abstracted approval judgment information exists in the reply electronic mail 510 (Step S5, YES), abstracts the approval judgment information from the reply electronic mail 510 (Step S6). Next, the approval allowance/disallowance judging portion 133 judges whether approval result information described in the abstracted approval judgment information is "allowance" or "disallowance" (Step S7).

On the one hand, the approval allowance/disallowance judging portion 133, when judged that the approval result information described in the abstracted approval judgment information is "disallowance" (Step S7, NO), shifts to execute the process of Step S5. On the other hand, the approval allowance/disallowance judging portion 133, when judged that the approval result information described in the abstracted approval judgment information is "allowance" (Step S7, YES), outputs the abstracted approval judgment information to the image processing section 140.

In the embodiment, the approval allowance/disallowance judging portion 133, when abstracted the approval judgment information of "Application Form/Managing Part/B Application Form>disallowance", shifts to execute the process of Step S5; further, when abstracted the approval judgment information of "Application Form/Managing Part/A Application Form>allowance", outputs the abstracted approval judgment information of "Application Form/Managing Part/A Application Form>allowance" to the image processing section 140.

When the approval judgment information is inputted to the image processing section 140 from the approval allowance/disallowance judging portion 133, the image compounding portion 141 reads out the compound condition from the compound condition storing portion 124; further reads out the first image data stored in the first image data storing portion 121 and the second image data stored in the second image data storing portion 122; then compounds the first image data with the second image data on the basis of the compound condition so as to generate compound image data (Step S8); and writes the generated compound image data into the work area (not shown) of the storing section 120. After that, the image compounding portion 141 outputs a notification representing the compound image data has been generated to the apparatus managing section 110.

In the embodiment, when the approval judgment information of "A01: Application Form/Managing Part/A Application Form>allowance" is inputted to the image processing section 140, the image compounding portion 141 reads out the first image data of A application form file from the A application form file of specific area "Application Form/Managing Part/A Application Form" of the first image data storing portion 121 and reads out the second image data stored in the second image data storing portion 122; as shown by FIG. 4, through making the (0, 0) coordinate position of lower left point in the input image of A application form finally coincide with the (0, 0) coordinate position of lower left point in the approval image, compounds the approval image into the input image by overwriting the second image data onto the first image data, so that an A application form indicated by mark C is obtained as a compound image, in which a seal of "TANAKA" serving as an approval image is stated in the input image of A application form.

The apparatus managing section 110, after received the notification from the image compounding portion 141, sends a print request to print the compound image stored in the work area of the storing section 120 to the printing section 170.

The printing section 170, after received the print request from the apparatus managing section 110, reads out the compound image data in order stored in the work area of the storing section 120, and prints the compound image (Step S9). The printing section 170 ends the print of the compound image and outputs a notification representing print has ended to the apparatus managing section 110.

Then, the apparatus managing section 110 deletes the first image data read out while generating the compound image from the specific area of the first image data storing portion 121 of the storing section 120 and deletes the compound image data stored in the work area (Step S10), shifts to execute the process of the step S5, and continues the same processes as stated above.

According to the embodiment 1, in the case that the approval allowance/disallowance judging portion 133 judged that the print of the first image data of input image is allowed through referring to the reply electronic mail 510, the printing section 170 prints a compound image obtained through the image compounding portion 141 compounds the second image data of approval image onto the first image data of input image. Therefore, it is possible to enable the print request user to identify whether the input image requested to print is or not that needing an approval. As a result, the print request user can judge how to treat the print matter of the input image.

Embodiment 2

The image forming apparatus in the embodiment 2 of the present invention also is a MFP apparatus 10 functioning as an image forming apparatus, and it is used in the same image forming system as the embodiment 1. The MFP apparatus 10 comprises the same apparatus managing section 110; reading section 150; operation panel section 160; printing section 170; and I/F section 180 as that in the embodiment 1. But the MFP apparatus 10 comprises a storing section 220; an approving section 230; and an image processing section 240 that are different from the storing section 120; the approving section 130; and the image processing section 140 in embodiment 1. Here, regarding the same apparatus managing section 110; reading section 150; operation panel section 160; printing section 170; and I/F section 180 as that in the embodiment 1, their explanations are omitted.

Figure 6:
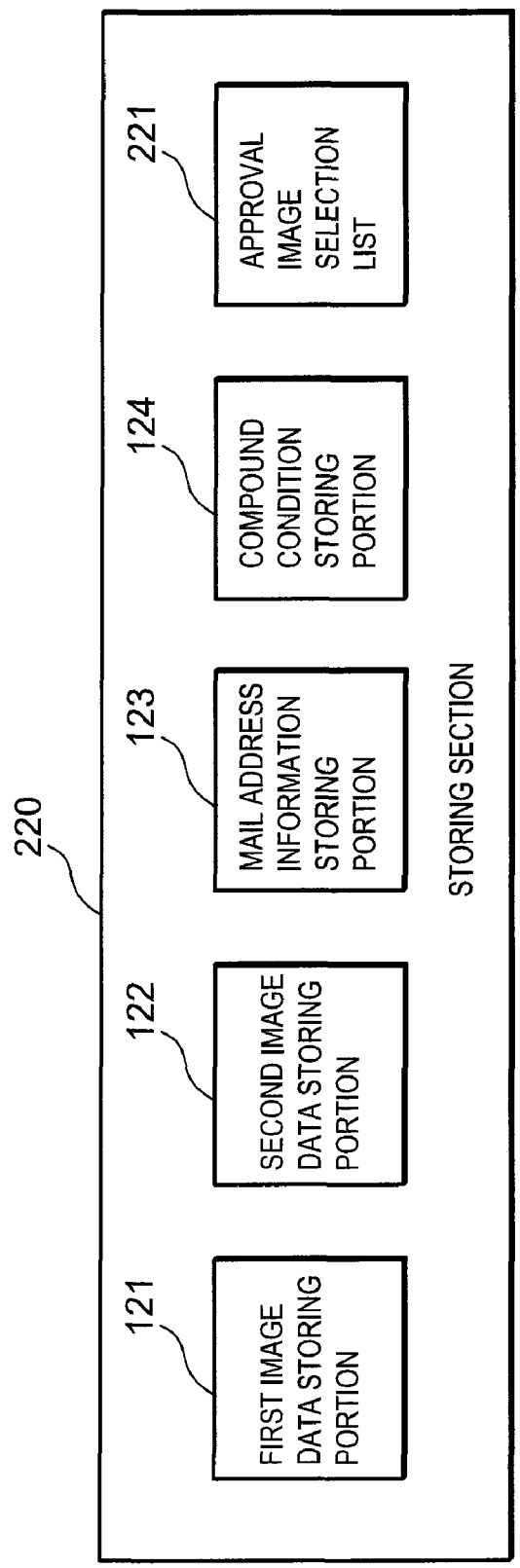
FIG. 6 is a block diagram showing a structure of a storing section in embodiment 2 of the present invention.

FIG. 6 is a block diagram showing a structure of a storing section in embodiment 2 of the present invention.

As shown by FIG. 6, the storing section 220 includes a first image data storing portion 121, a second image data storing portion 122, a mail address information storing portion 123, a compound condition storing portion 124, and an approval image selection list 221. The first image data storing portion 121, the second image data storing portion 122, the mail address information storing portion 123 and the compound condition storing portion 124 are the same as that in the embodiment 1, their explanations are omitted.

FIG. 7 is a diagram showing an example of approval image selection list in FIG. 6.

As shown by FIG. 7, in the approval image selection list 221, there are approval image designation information and approval ID used for distinguishing approval image corresponding to the approval image designation information. Here, corresponding to the approval image designation information of "inexistence", the approval image explained in the image forming apparatus of embodiment 1 is listed.

Figure 8:
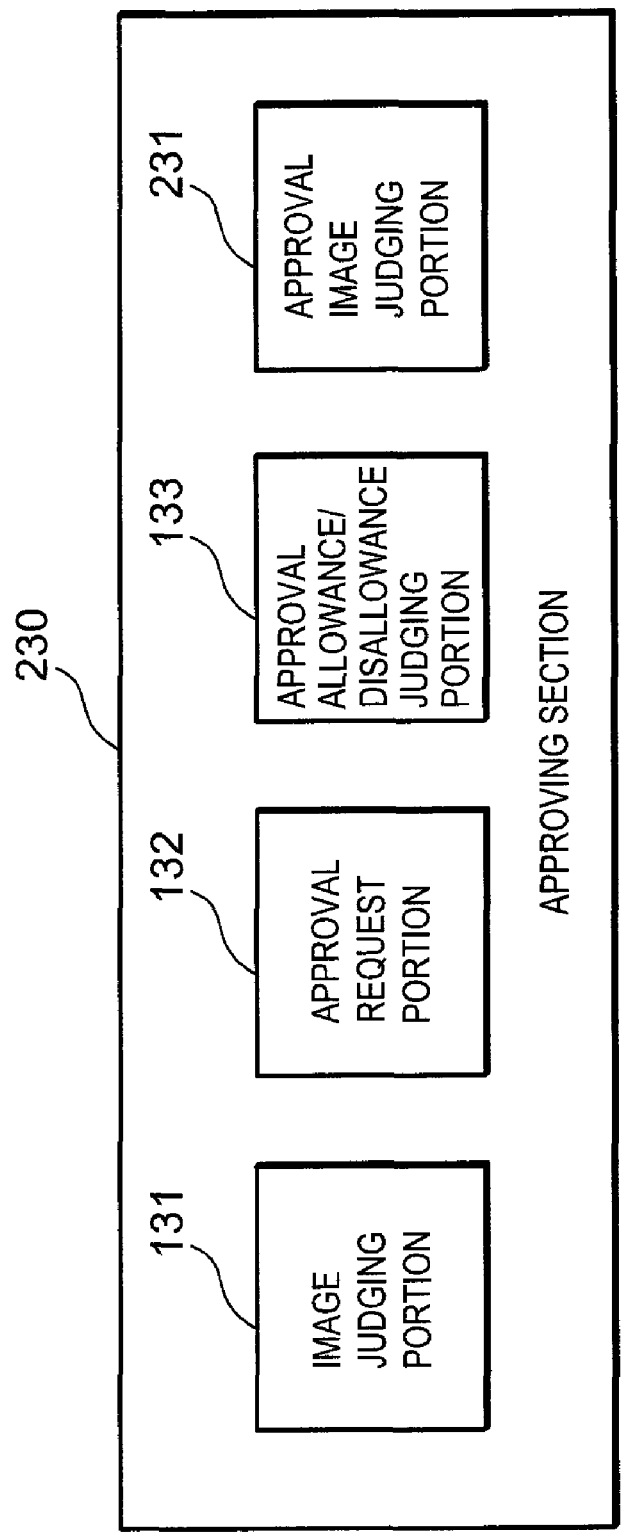
FIG. 8 is a block diagram showing a structure of an approving section in embodiment 2 of the present invention.

FIG. 8 is a block diagram showing a structure of an approving section in embodiment 2 of the present invention.

As shown by FIG. 8, the approving section 230 includes an image judging portion 131, an approval request portion 132, an approval allowance/disallowance judging portion 133, and an approval image judging portion 231. Here, the image judging portion 131, the approval request portion 132 and the approval allowance/disallowance judging portion 133 are the same as that in embodiment 1, their explanations are omitted.

In the case that the approval allowance/disallowance judging portion 133 judged that a print approval is "allowance" about the input image stored in the first image data storing portion 121, the approval image judging portion 231 decides an approval image that is designated by the approval image designation information described in the reply electronic mail (mentioned below) outputted from the PC 22, from the second image data of approval image stored in the second image data storing portion 122.

Figure 9:
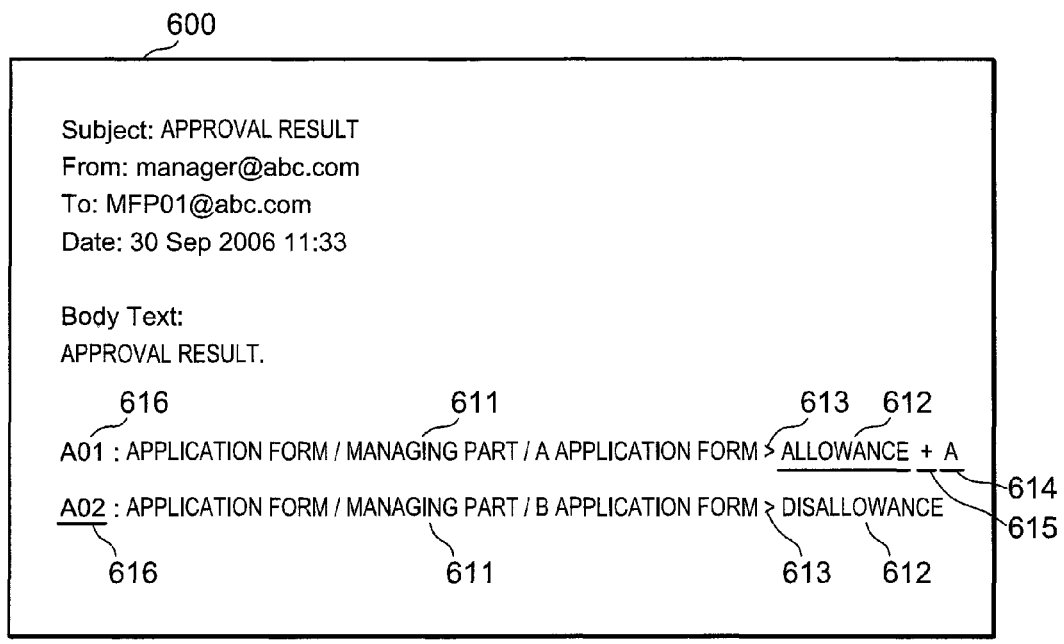
FIG. 9 is a diagram showing an example of reply electronic mail received by an image forming apparatus in embodiment 2.

FIG. 9 is a diagram showing an example of reply electronic mail received by an image forming apparatus in embodiment 2.

As shown by FIG. 9, in the reply electronic mail 600, there is a header of electronic mail. In the header, there are a title (Subject) column to state "Approval Result"; a From column indicating a sending source to state a mail address of "manager@abc.com" assigned to the PC 22 serving as an approval person terminal; a To column indicating a sending destination to state a mail address of "MFP01@abc.com" assigned to the MFP apparatus 10; and a Date column indicating a sending date to state a date of "30 Sep. 2006 11:33".

Further, in the reply electronic mail 600, there is a text. In the text, a specific area name 611 called "Application Form/Managing Part/A Application Form"; an approval result information 612 that is "Allowance" representing that the approval person allows the print; a distinguishment character 613 that is ">" for specifying the approval result information 612; an approval image designation information 614 that is "A"; and a distinguishment character 615 that is "+" for designating place of the approval image designation information are stated, according to an order of the specific area name 611, the distinguishment character 613, the approval result information 612, the distinguishment character 615, and the approval image designation information 614, as approval judgment information. In front of the approval judgment information, a distinguishment number 616 for distinguishing the approval judgment information is stated. Furthermore, a specific area name 611 called "Application Form/Managing Part/B Application Form"; an approval result information 612 that is "Disallowance" representing that the approval person disallows the print; and a distinguishment character 613 that is ">" for specifying the approval result information 612 are stated according to an order of the specific area name 611, the distinguishment character 613 and the approval result information 612, as approval judgment information. In front of the approval judgment information, a distinguishment number 616 for distinguishing the approval judgment information is stated. Moreover, in the approval judgment information in which the specific area name 611 called "Application Form/Managing Part/B Application Form" is stated, because it is unnecessary to compound input image with approval image, the approval image designation information 614 and distinguishment character 615 are not stated.

Figure 10:
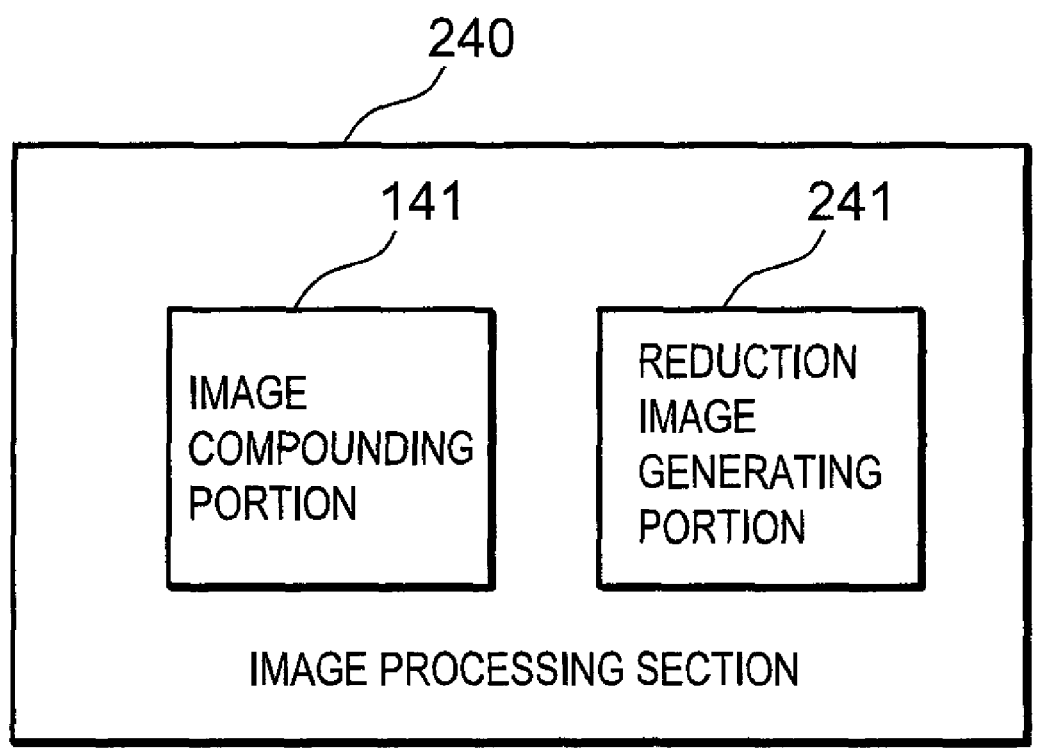
FIG. 10 is a block diagram showing a structure of an image processing section in embodiment 2 of the present invention.

FIG. 10 is a block diagram showing a structure of an image processing section in embodiment 2 of the present invention.

As shown by FIG. 10, the image processing section 240 has an image compounding portion 141 and a reduction image generating portion 241. Here, because the image compounding portion 141 is the same as that in the embodiment 1, its explanation is omitted.

The reduction image generating portion 241 generates thumbnail image with a reduction size which enables the approval person to perform an approval of print allowance of input image; stores the thumbnail image into the work area of the storing section 220; and sends a notification representing that thumbnail image has been generated to the apparatus managing section 110.

Next, operation of the image forming apparatus in embodiment 2 of the present invention is explained.

Figure 11:
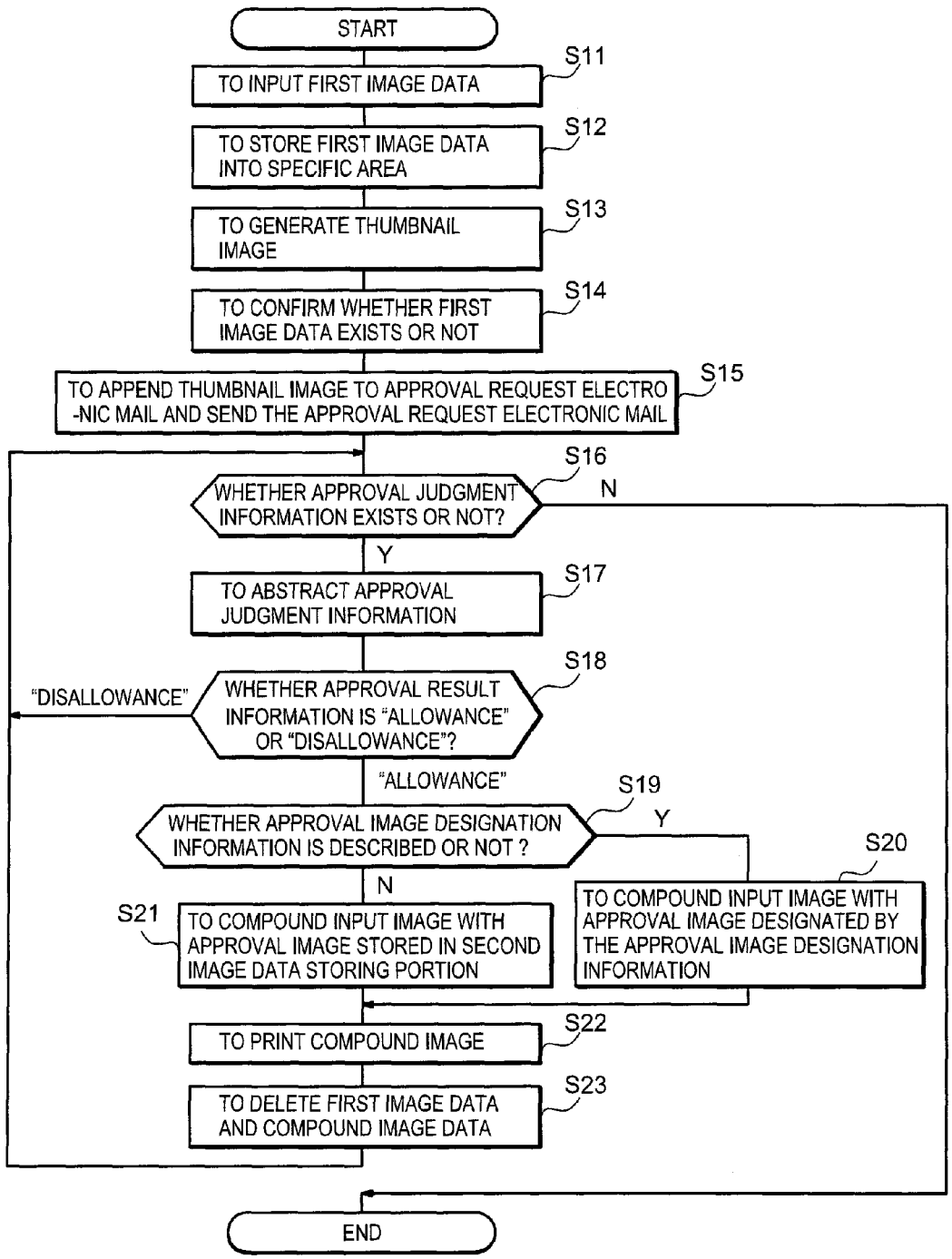
FIG. 11 is a flowchart showing operation of an image forming apparatus in embodiment 2 of the present invention.

FIG. 11 is a flowchart showing operation of an image forming apparatus in embodiment 2 of the present invention.

In the embodiment 2, the process to input first image data of input image in step S11 and the process to store the inputted first image data into the specific area of the first image data storing portion 121 in step S12 are the same as the processes in steps S1 and S2 of the embodiment 1.

In the step S12, after the first image data is stored into the specific area of the first image data storing portion 121, the apparatus managing section 110 sends a generation request to the image processing section 240 for generating thumbnail image about input image of the first image data stored in the first image data storing portion 121.

After the image processing section 240 received the generation request from the apparatus managing section 110, the reduction image generating portion 241 sequentially reads out first image data from the first image data storing portion 121, and generates thumbnail image according to a predetermined reduction rate from the read first image data (Step S13). Further, the reduction image generating portion 241 sends a notification representing that the thumbnail image has been generated to the apparatus managing section 110.

The apparatus managing section 110, after received the notification from the reduction image generating portion 241, sends a confirmation request to the approving section 230 to confirm whether the first image data to be approved is existent or not.

After the approving section 230 received the confirmation request from the apparatus managing section 110, the image judging portion 131 confirms whether first image data that is waiting for approval exists or not through detecting whether file in which first image data is described exists in the specific area of the first image data storing portion 121 or not (Step S14).

The image judging portion 131, after confirmed that the first image data that is waiting for approval exists, outputs a specific area name in which the first image data waiting for approval is stored to the approval request portion 132.

The approval request portion 132, after received the specific area name from the image judging portion 131, reads out the mail address "manager@abc.com" assigned to the PC 22 serving as an approval person terminal and the mail address "MFP01@abc.com" assigned to the self apparatus from the mail address information storing portion 123 of the storing section 120; and makes the same approval request electronic mail 500 as shown by the FIG. 3A. After that, the approval request portion 132 reads out the thumbnail image stored in the work area of the storing section 220 and sends the read thumbnail image to the PC 22 serving as an approval person terminal via the network 20 after appended the read thumbnail image to the approval request electronic mail 500 (Step S15).

After a reply electronic mail is sent from the PC 22 in order to reply to the approval request electronic mail, these processes are executed from step S16 to judge whether approval judgment information exists or not in the reply electronic mail 510 to step S18 to judge whether the approval result information is "Allowance" or "Disallowance". These processes are the same as that corresponding to steps S5~S7 in embodiment 1.

In step S18, the approval allowance/disallowance judging portion 133, when judged that the approval result information described in the abstracted approval judgment information is "allowance" (Step S18, YES), outputs a notification representing it is "allowance" to the approval image judging portion 231.

The approval image judging portion 231, when received the notification from the approval allowance/disallowance judging portion 133, judges whether approval image designation information is described in the approval judgment information or not (Step S19). The approval image judging portion 231, when judged that approval image designation information is described in the approval judgment information (Step S19, YES), abstracts the approval image designation information from the approval judgment information. Next, the approval image judging portion 231 outputs the abstracted approval image designation information to the image processing section 240.

For example, in the case that a notification representing "allowance" is inputted about the approval judgment information of "Application Form/Managing Part/A Application Form>+A", the approval image judging portion 231 abstracts the approval image designation information "A" from the approval judgment information and outputs the approval image designation information "A" to the image processing section 240.

When the approval image designation information is inputted to the image processing section 240 from the approval image judging portion 231, the image compounding portion 141 reads out the compound condition from the compound condition storing portion 124 and reads out the approval image ID corresponding to the inputted approval image designation information from the approval image selection list 221. next, the image compounding portion 141 further reads out the first image data stored in the first image data storing portion 121 and the second image data which is stored in the second image data storing portion 122 and corresponds to the previously read approval image ID. Then, the image compounding portion 141 compounds the first image data with the second image data on the basis of the compound condition so as to generate compound image data (Step S20); and writes the generated compound image data into the work area (not shown) of the storing section 220. After that, the image compounding portion 141 outputs a notification representing the compound image data has been generated to the apparatus managing section 110; and shifts the flow to step S22.

In the embodiment, because the approval image designation information is "A", the approval image ID corresponds to "D002", so the second image data of approval image formed from a seal "SHIMIZU" is read out from the second image data storing portion 122, the second image data is overwritten on the first image data of input image stored in the first image data storing portion 121, then the input image and the approval image are compounded.

In the step S19, the approval image judging portion 231, when judged that approval image designation information is not described in the approval judgment information (Step S19, NO), outputs a compound request to the image processing section 240 to compound approval image which is not designated by approval image designation information with input image.

When the compound request is inputted to the image processing section 240 from the approval image judging portion 231, the image compounding portion 141 reads out the compound condition from the compound condition storing portion 124, reads out the first image data stored in the first image data storing portion 121 and the second image data stored in the second image data storing portion 122. Then, the image compounding portion 141 compounds the first image data with the second image data on the basis of the compound condition so as to generate compound image data (Step S21); and writes the generated compound image data into the work area (not shown) of the storing section 220. After that, the image compounding portion 141 outputs a notification representing the compound image data has been generated to the apparatus managing section 110.

Further, processes in step S22 to print the compound image by the printing section 170 and in step S23 to delete the first image data and the compound image data by the apparatus managing section 110 are executed. These processes are the same as that in steps S9 and S10 of embodiment 1.

According to the embodiment 2, the approval request portion 132 appends the thumbnail image generated through the reduction image generating portion 241 reduces the input image to the approval request electronic mail, then sends the approval request electronic mail to the PC 22 serving as an approval person terminal, the approval person can previously confirm the content of document to be approved. So it is possible to prevent mistake of approval from happening while performing approval of print allowance.

Further, according to the embodiment 2, because the approval image judging portion 231 decides the approval image stored in the second image data storing portion 122 on the basis of the approval image designation information described in the reply electronic mail, it is possible to designate the approval image according to the document. As a result, it is possible to prevent that the document is printed with an unsuitable approval image.

Embodiment 3

The image forming apparatus in the embodiment 3 of the present invention also is a MFP apparatus 10 functioning as an image forming apparatus, and it is used in the same image forming system as the embodiment 2. The MFP apparatus 10 comprises the same apparatus managing section 110; storing section 220; image processing section 240; reading section 150; operation panel section 160; printing section 170; and I/F section 180 as that in the embodiment 2. But the MFP apparatus 10 comprises an approving section 330 that is different from the approving section 230 in embodiment 2. Here, regarding the same apparatus managing section 110; storing section 220; image processing section 240; reading section 150; operation panel section 160; printing section 170; and I/F section 180 as that in the embodiment 2, their explanations are omitted.

Figure 12:
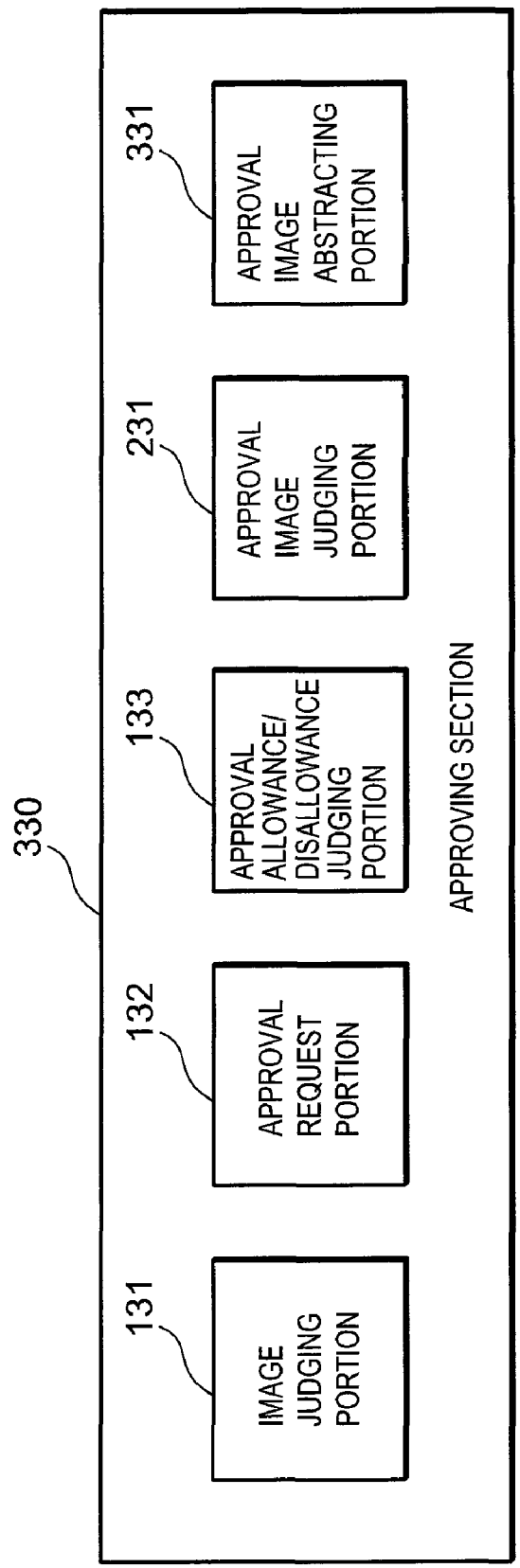
FIG. 12 is a block diagram showing a structure of an approving section in embodiment 3 of the present invention.

FIG. 12 is a block diagram showing a structure of an approving section in embodiment 3 of the present invention.

As shown by FIG. 12, the approving section 330 includes an image judging portion 131, an approval request portion 132, an approval allowance/disallowance judging portion 133, an approval image judging portion 231, and an approval image abstracting portion 331. Here, the image judging portion 131, the approval request portion 132, the approval allowance/disallowance judging portion 133 and the approval image judging portion 231 are the same as that in embodiment 2, their explanations are omitted.

In the case that the approval allowance/disallowance judging portion 133 judged that a print approval is "allowance" about the first image data of input image stored in the first image data storing portion 121, the approval image abstracting portion 331 abstracts an appendage approval image which is appended to the reply electronic mail (mentioned below) outputted from the PC 22 serving as an approval person terminal. Then, the approval image abstracting portion 331 further makes the appendage approval image that is abstracted be stored into the work area of the storing section 220, as appendage image data.

Figure 13:
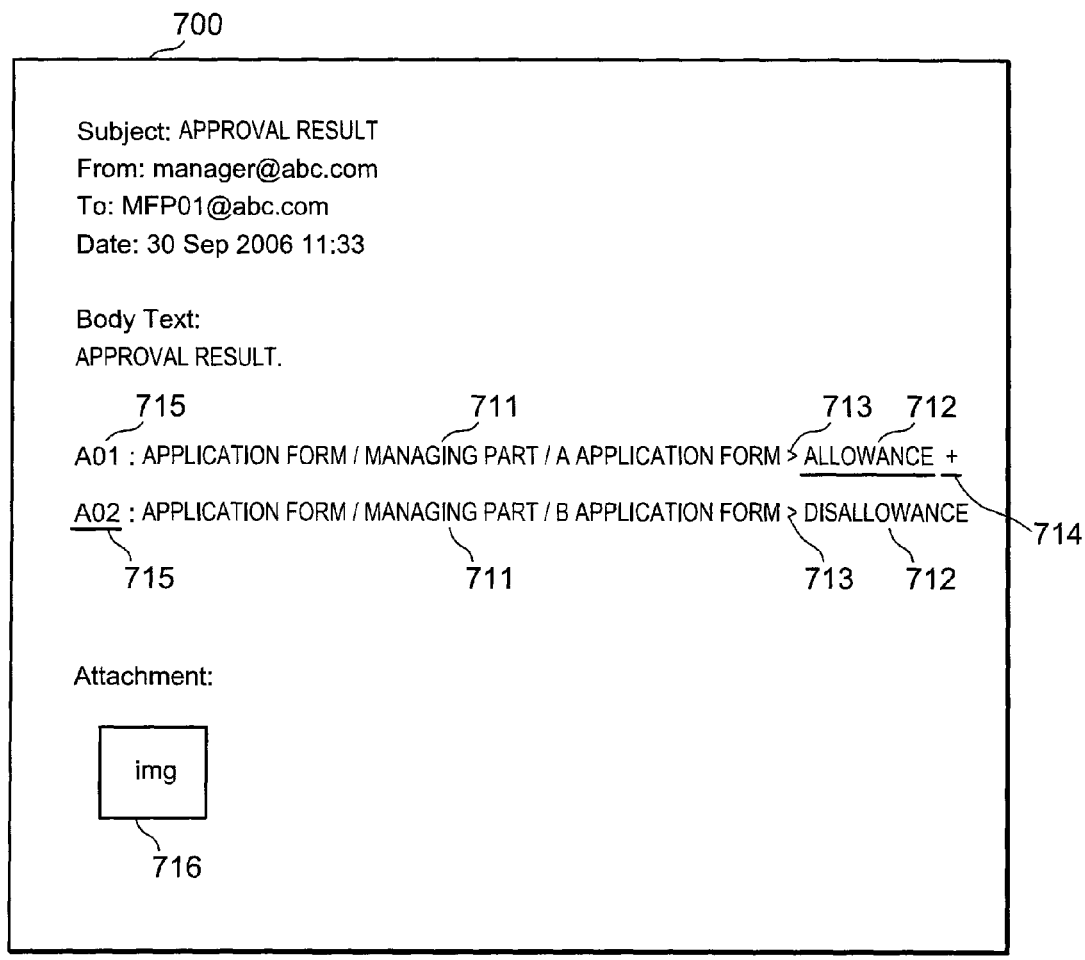
FIG. 13 is a diagram showing an example of reply electronic mail received by an image forming apparatus in embodiment 3.

FIG. 13 is a diagram showing an example of reply electronic mail received by an image forming apparatus in embodiment 3.

As shown by FIG. 13, in the reply electronic mail 700, there is a header of electronic mail. In the header, there are a title (Subject) column to state "Approval Result"; a From column indicating a sending source to state a mail address of "manager@abc.com" assigned to the PC 22 serving as an approval person terminal; a To column indicating a sending destination to state a mail address of "MFP01@abc.com" assigned to the MFP apparatus 10; and a Date column indicating a sending date to state a date of "30 Sep. 2006 11:33".

Further, in the reply electronic mail 700, there is a text. In the text, a specific area name 711 called "Application Form/Managing Part/A Application Form"; an approval result information 712 that is "Allowance" representing that the approval person allows the print; a distinguishment character 713 that is ">" for specifying the approval result information 712; and a distinguishment character 714 that is "+" for designating place of the approval image designation information are stated, according to an order of the specific area name 711, the distinguishment character 713, the approval result information 712, and the distinguishment character 714, as approval judgment information. In front of the approval judgment information, a distinguishment number 715 for distinguishing the approval judgment information is stated. Furthermore, a specific area name 711 called "Application Form/Managing Part/B Application Form"; an approval result information 712 that is "Disallowance" representing that the approval person disallows the print; and a distinguishment character 713 that is ">" for specifying the approval result information 712 are stated according to an order of the specific area name 711, the distinguishment character 713 and the approval result information 712, as approval judgment information. In front of the approval judgment information, a distinguishment number 715 for distinguishing the approval judgment information is stated. Moreover, in the approval judgment information in which the specific area name 611 called "Application Form/Managing Part/B Application Form" is stated, because it is unnecessary to compound input image with approval image, the distinguishment character 714 is not stated.

Further, in the text of the reply electronic mail 700, an appendage approval image 716 formed from image data is appended for approving input image of first image data stored in the first image data storing portion 121.

Next, operation of the image forming apparatus in embodiment 3 of the present invention is explained.

Figure 14A:
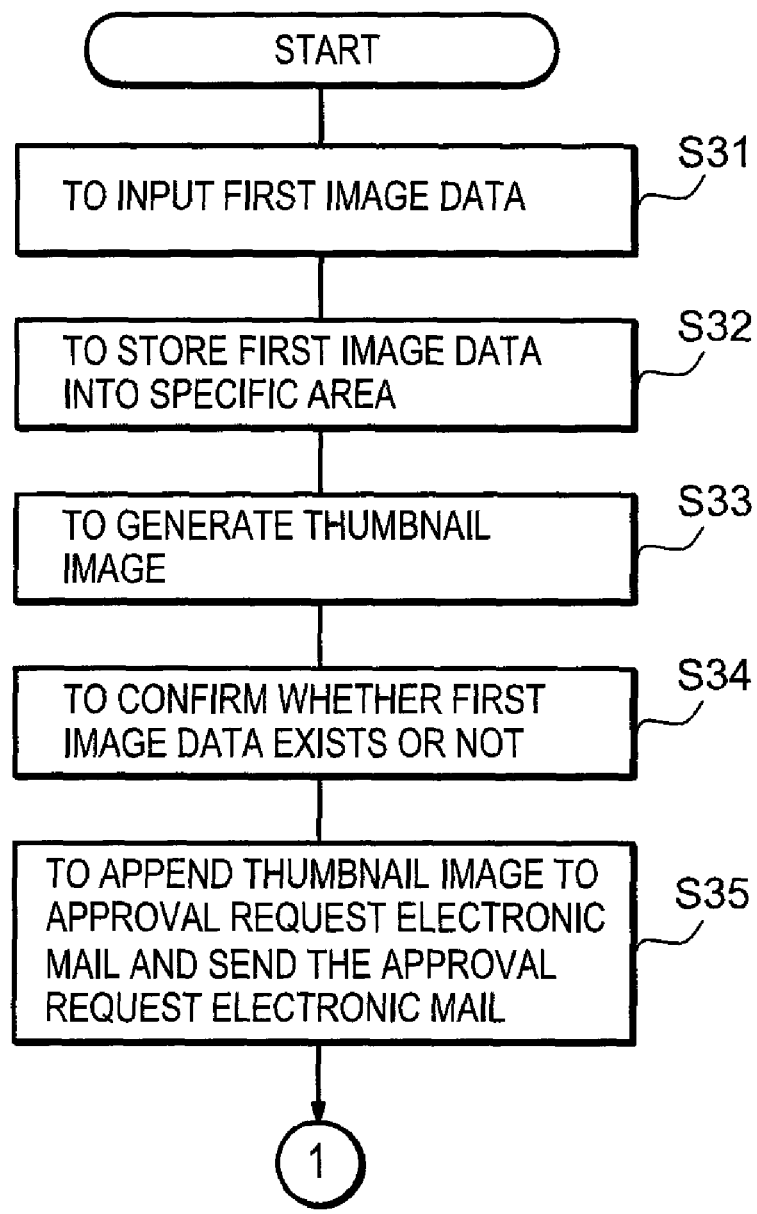
FIG. 14 is a flowchart showing operation of an image forming apparatus in embodiment 3 of the present invention.
Figure 14B:
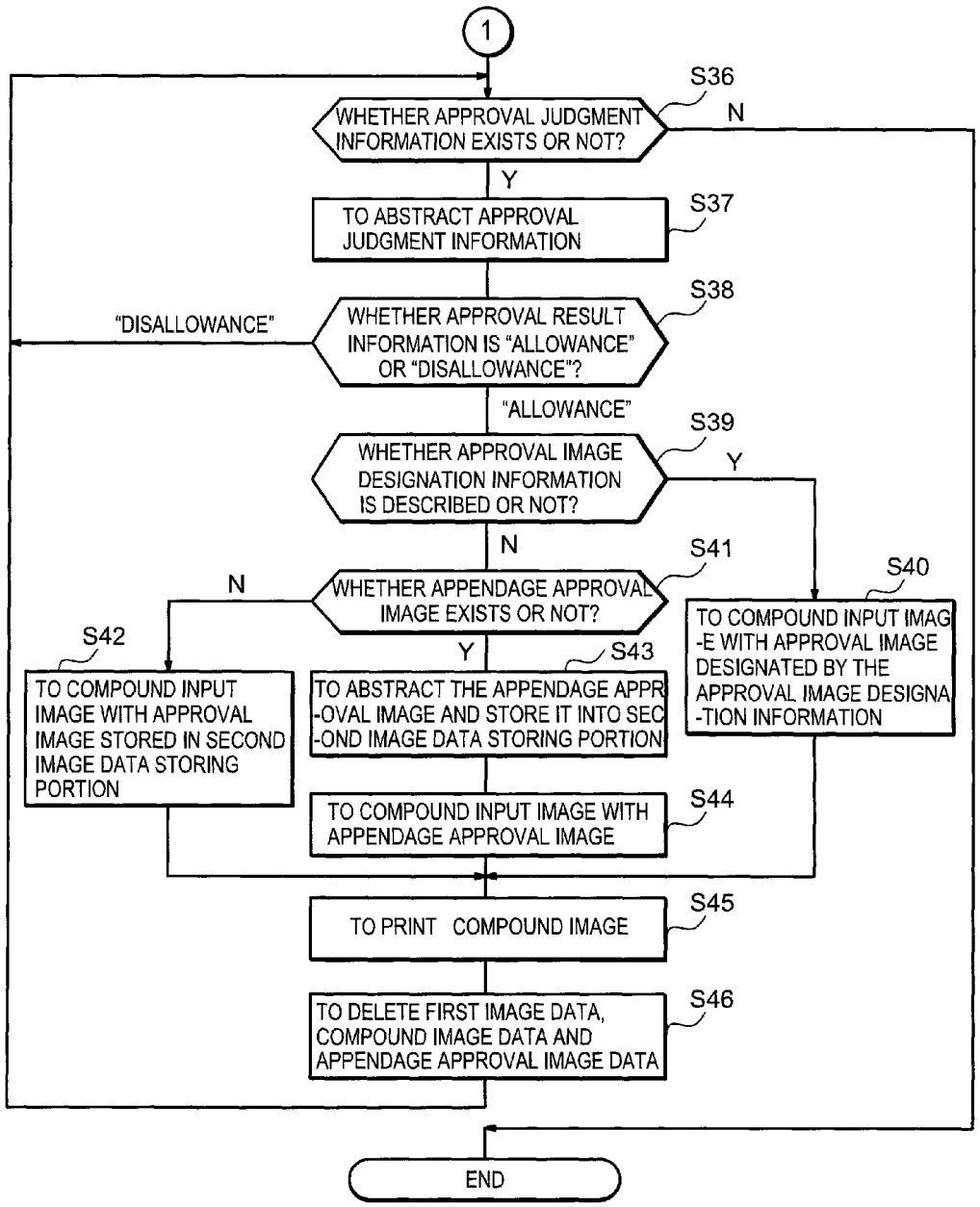

FIG. 14 is a flowchart showing operation of an image forming apparatus in embodiment 3 of the present invention.

In the embodiment 3, these processes from step S31 to input first image data of input image to step 40 to compound input image with approval image designated by approval image designation information are the same as the processes from step S11 to step S20 in embodiment 2.

In the step S39, the approval image judging portion 231, when judged that approval image designation information is not described in the approval judgment information (Step S39, NO), further judges whether an appendage approval image is appended to the reply electronic mail or not (Step S41). The approval image judging portion 231, when judged that the appendage approval image is not appended (Step S41, NO), outputs the approval judgment information to the image processing section 240.

When the approval judgment information is inputted to the image processing section 240 from the approval image judging portion 231, the image compounding portion 141 reads out the compound condition from the compound condition storing portion 124, reads out the first image data stored in the first image data storing portion 121 and the second image data stored in the second image data storing portion 122. Then, the image compounding portion 141 compounds the first image data with the second image data on the basis of the compound condition so as to generate compound image data (Step S42); and writes the generated compound image data into the work area of the storing section 220. After that, the image compounding portion 141 outputs a notification representing the compound image data has been generated to the apparatus managing section 110, and shifts to process step S45.

In the step S41, in the case that the approval image judging portion 231 judged that the appendage approval image is appended to the reply electronic mail (Step S41, YES), the approval image abstracting portion 331 abstracts the appendage approval image, and stores the image data of the appendage approval image into the work area of the storing section 220 (Step S43). Next, the approval image abstracting portion 331 outputs a notification representing that the appendage approval image has been abstracted to the apparatus managing section 110.

The apparatus managing section 110, after received the notification from the approval image abstracting portion 331, outputs a notification representing that the appendage approval image has been stored in the work area of the storing section 220 to the image processing section 240.

After that, the image compounding portion 141 of the image processing section 240 reads out the compound condition from the compound condition storing portion 124, reads out the first image data stored in the first image data storing portion 121 and the image data of the appendage approval image stored in the work area of the storing section 220. Then, the image compounding portion 141 compounds the first image data with the image data of the appendage approval image on the basis of the compound condition so as to generate compound image data (Step S44); and writes the generated compound image data into the work area of the storing section 220.

After that, as performed by the image forming apparatus of the embodiment 2, the printing section 170 prints the compound image data stored in the work area of the storing section 220 (Step S45). Then, the apparatus managing section 110 deletes the first image data of input image in the first image data storing portion 121, the compound image data stored in the work area and the appendage approval image data (Step S46); and shifts the flow to step S36.

According to the embodiment 3, because the approval image abstracting portion 331 abstracts the appendage approval image appended to reply electronic mail and the image compounding portion 141 compounds the abstracted appendage approval image onto input image, the approval person can optionally change approval image according to document to be approved. Further, because the apparatus managing section 110 deletes the appendage approval image from the work area of the storing section 220 just after approval, it is possible to prevent that the appendage approval image is applied to other document.

Embodiment 4

The image forming apparatus in the embodiment 4 of the present invention also is a MFP apparatus 10 functioning as an image forming apparatus, and it is used in the same image forming system as the embodiment 3. The MFP apparatus 10 comprises the same apparatus managing section 110; reading section 150; operation panel section 160; printing section 170; and I/F section 180 as that in the embodiment 3. But the MFP apparatus 10 comprises a storing section 420 that is different from the storing section 220 in embodiment 3; and an image processing section 440 that is different from the image processing section 240. Here, regarding the same sections as apparatus managing section 110; reading section 150; operation panel section 160; printing section 170; and I/F section 180 and the like, their explanations are omitted.

Figure 15:
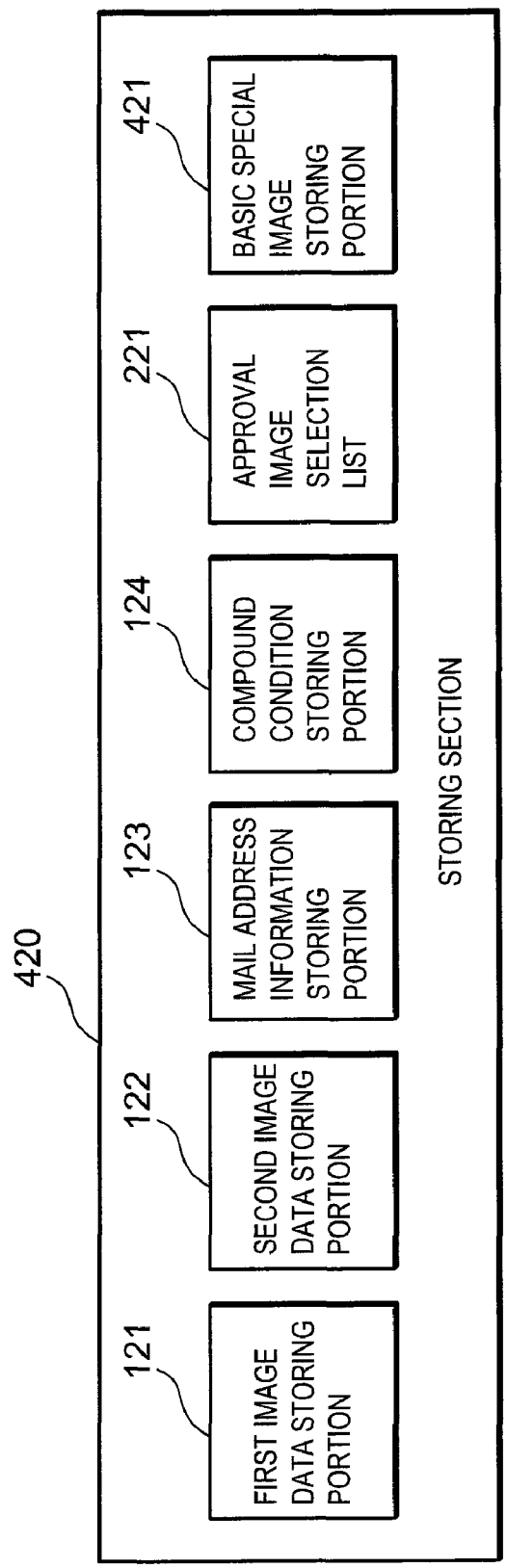
FIG. 15 is a block diagram showing a structure of a storing section in embodiment 4 of the present invention.

FIG. 15 is a block diagram showing a structure of a storing section in embodiment 4 of the present invention.

As shown by FIG. 15, the storing section 420 includes a first image data storing portion 121, a second image data storing portion 122, a mail address information storing portion 123, a compound condition storing portion 124, an approval image selection list 221 and a basic special image storing portion 421. Here, because the first image data storing portion 121, the second image data storing portion 122, the mail address information storing portion 123, the compound condition storing portion 124, and the approval image selection list 221 are the same as that in the embodiment 3, their explanations are omitted.

The basic special image storing portion 421 stores a plurality of basic special images needed for generating special image such as secret pattern formed from monochrome image that is not copied when copying print matter.

Figure 16:
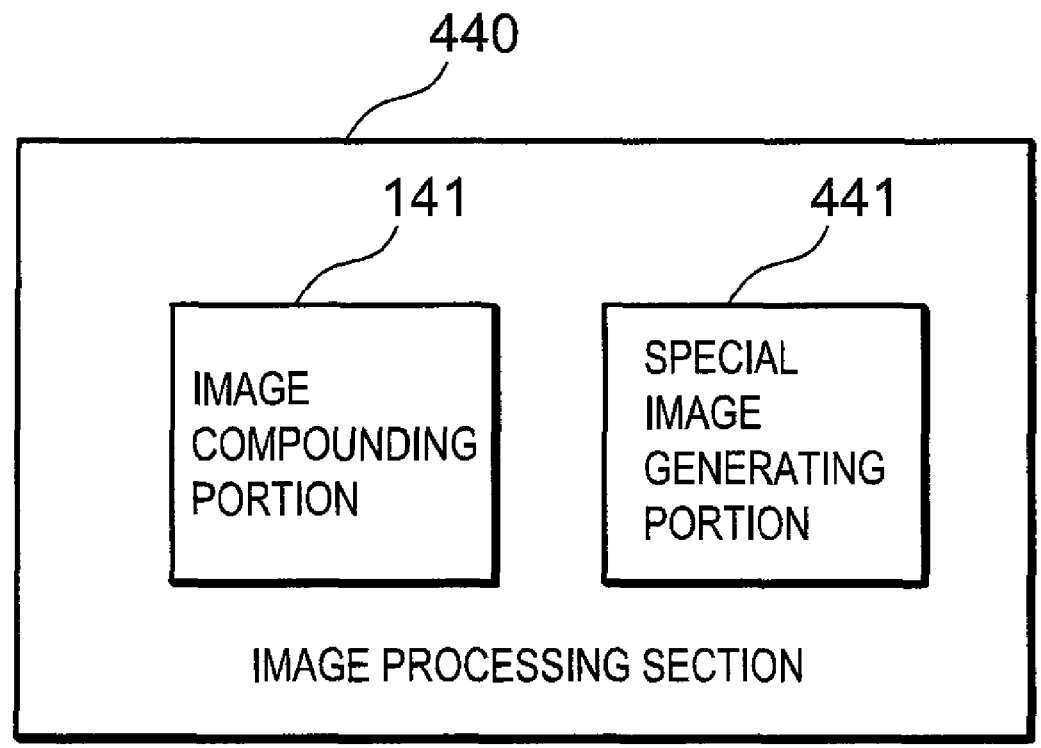
FIG. 16 is a block diagram showing a structure of an image processing section in embodiment 4 of the present invention.

FIG. 16 is a block diagram showing a structure of an image processing section in embodiment 4 of the present invention.

As shown by FIG. 16, the image processing section 440 includes an image compounding portion 141 and a special image generating portion 441. Here, the image compounding portion 141 is the same as that in embodiment 3, its explanation is omitted.

The special image generating portion 441 reads out the predetermined basic special image from the basic special image storing portion 421, and generates a special image which is used for compounding to input image stored in the first image data storing portion 121.

Next, operation of the image forming apparatus in embodiment 4 of the present invention is explained.

Figure 17A:
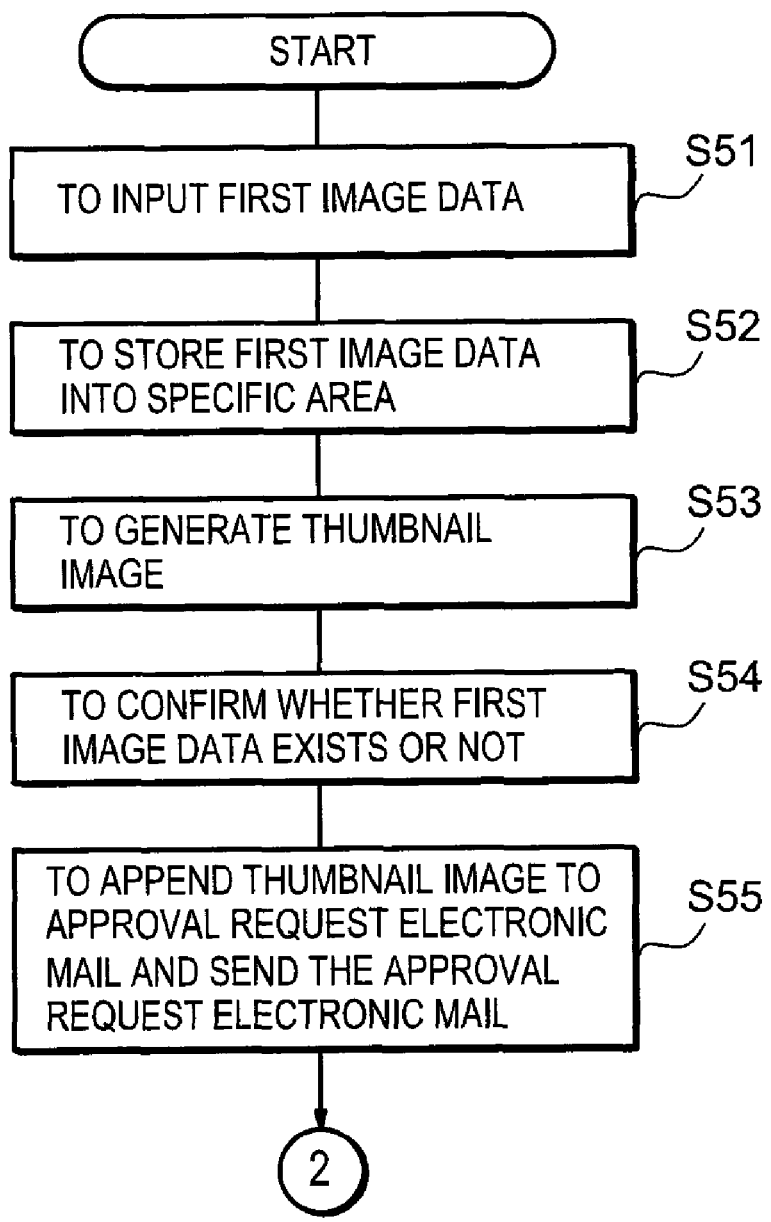
FIG. 17 is a flowchart showing operation of an image forming apparatus in embodiment 4 of the present invention.
Figure 17B:
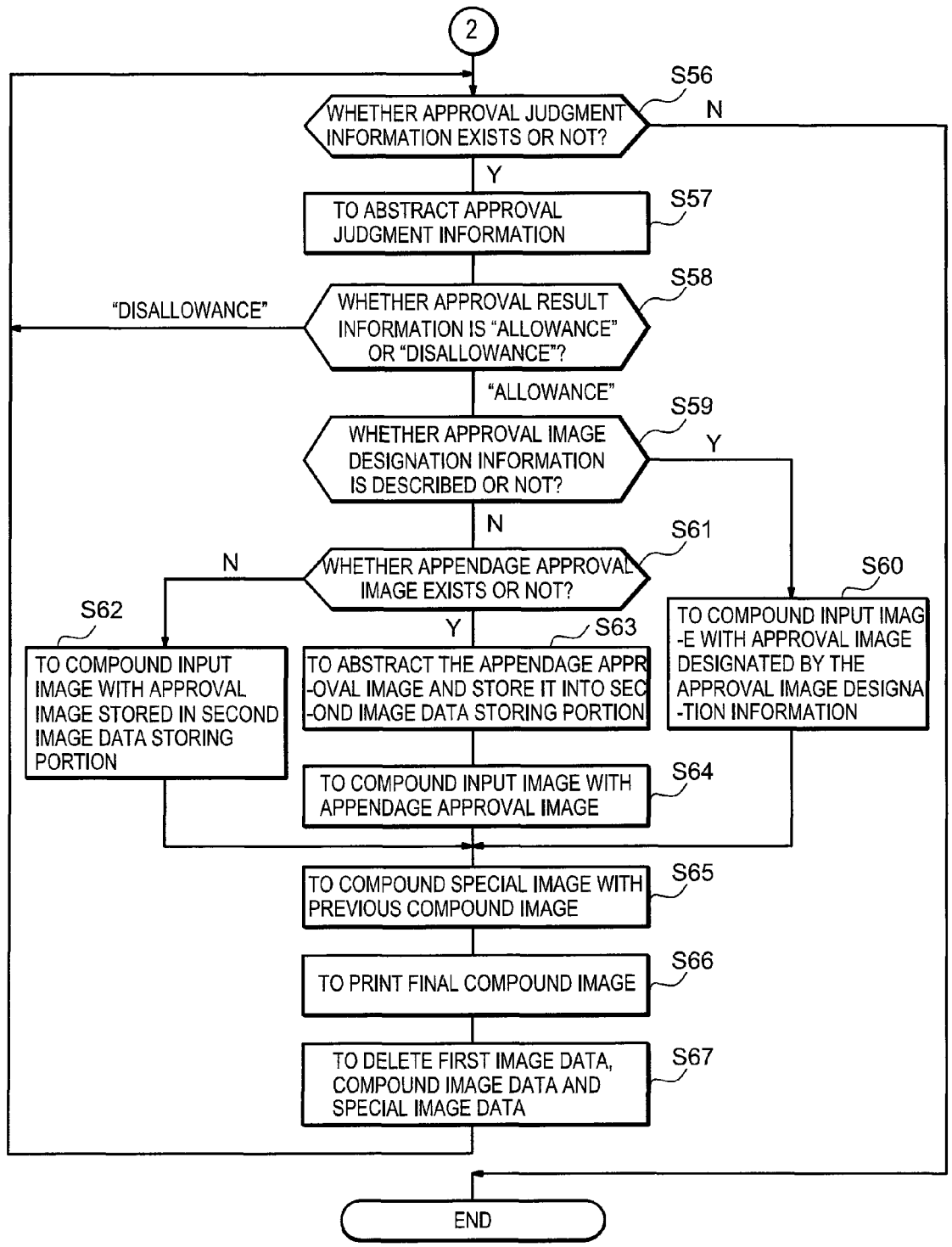

FIG. 17 is a flowchart showing operation of an image forming apparatus in embodiment 4 of the present invention.

In the embodiment 4, these processes from step S51 to input first image data of input image to step 64 to compound input image with approval image or appendage approval image are the same as the processes from step S31 to step S44 in embodiment 3.

In the step S64, after the image compounding portion 141 compounded the input image with the approval image or the appendage approval image, the special image generating portion 441 reads out the basic special image from the basic special image storing portion 421 of the storing section 420 for compounding the input image, generates a special image that is placed in a predetermined position, and makes the special image be stored into the work area of the storing section 420. After that, the special image generating portion 441 outputs a notification representing the special image has been generated to the image compounding portion 141.

The image compounding portion 141, when received the notification from the special image generating portion 441, sequentially reads out the compound image data of compound image that is obtained by compounding the input image stored in the work area of the storing section 420 with the approval image or the appendage approval image, and the image data of the special image stored in the work area; compounds the compound image data previously compounded with the image data of the special image (Step S65); and stores compound image data compounded again into the work area of the storing section 420.

After that, as performed by the image forming apparatus of the embodiment 3, the printing section 170 prints the compound image data stored in the work area of the storing section 220 (Step S66). Then, the apparatus managing section 110 deletes the first image data of input image in the first image data storing portion 121, the compound image data stored in the work area, the image data of the special image (Step S67). While deleting, if the appendage approval image data exists, the appendage approval image also is deleted (Step S67). Then, the flow is shifted to step S56.

According to the embodiment 4, in the case that the approval allowance/disallowance judging portion 133 judged that the print allowance of input image is approved, the image compounding portion 141 compounds the approval image stored in the second image data storing portion 122 onto input image stored in the first image data storing portion 121 so as to obtain a compound image; further compounds the special image generated by the special image generating portion 441 onto the obtained compound image. Therefore, when copying the print matter on which the image finally compounded is printed, the special image is not copied, it is possible to prevent document from being forged by other person.

In the embodiment 4, the special image such as secret pattern which is not copied when copying the print matter is compounded to the input image. However, such image which does not erase other printed image also can be used, the image may be printed into foundation of the print matter.

The present invention is not limited to the foregoing embodiment or example but many modifications and variations are possible within the spirit and scope of the appended claims of the invention.

What is claimed is:

1. An image forming apparatus which is connected through a network with i) an upper apparatus for creating an input image, and ii) an external terminal for approving printing of the input image, the image forming apparatus performing an image formation on the basis of the input image, comprising:
   a first storing portion that stores an input image received from the upper apparatus in a specific area;
   a second storing portion that stores an approval image indicating an approval of print allowance;
   an approval request portion that sends a request electronic mail to request the external terminal to approve the input image stored in the specific area of the first storing portion via the network, the request electronic mail containing a specific area name identifying the specific area;
   a judging portion that judges whether the input image is approved to print on the basis of a reply electronic mail from the external terminal with respect to the request electronic mail of the approval request portion the reply electronic mail containing the specific area name and approval result information for the input image; and
   an image compounding portion that, when the judging portion judges that the input image is approved, forms a compound image obtained by compounding the approval image stored in the second storing portion with the approved input image stored in the specific area.

2. The image forming apparatus according to claim 1, wherein the approval image is selected from the group consisting of a seal image and a signature image.

3. The image forming apparatus according to claim 1, further comprising:
   a reduction image generating portion that generates a reduction image by reducing the input image,
   wherein the approval request portion appends the reduction image generated by the reduction image generating portion to the request electronic mail.

4. The image forming apparatus according to claim 1, wherein the second storing portion stores plural approval images;
   the reply electronic mail contains selection information to select one of the plural approval images; and
   the image compounding portion forms the compound image by compounding the input image stored in the specific area with the approval image selected on the basis of the selection information.

5. The image forming apparatus according to claim 1, further comprising:
   a writing portion that writes the approval image into the second storing portion,
   wherein the reply electronic mail contains the approval image; and
   the writing portion abstracts the approval image from the reply electronic mail and writes the abstracted approval image into the second storing portion.

6. The image forming apparatus according to claim 1, further comprising:
   a basic special image storing portion that stores a basic special image for forming a special image; and
   a special image generating portion that generates the special image on the basis of the basic special image stored in the basic special image storing portion,
   wherein the image compounding portion further compounds the compound image with the special image generated by the special image generating portion.

7. The image forming apparatus according to claim 6, wherein the special image is an image which is not copied when copying a print matter on which the special image is printed.

8. The image forming apparatus according to claim 6, wherein the special image is an image which is printed in foundation of a print matter but does not erase other printed image.

* * * * *